(12) United States Patent
Coates (10) Patent No.: US 9,027,733 B2
(45) Date of Patent: May 12, 2015

(54) CONTAINER MANUFACTURE

(75) Inventor: Michael Jonathan Coates, Otley (GB)

(73) Assignee: Crown Packaging Technology, Inc., Alsip, IL (US)

(*) Notice: Subject to any disclaimer, the term of this patent is extended or adjusted under 35 U.S.C. 154(b) by 103 days.

(21) Appl. No.: 13/635,464

(22) PCT Filed: Mar. 4, 2011

(86) PCT No.: PCT/EP2011/053277
§ 371 (c)(1),
(2), (4) Date: Nov. 28, 2012

(87) PCT Pub. No.: WO2011/113710
PCT Pub. Date: Sep. 22, 2011

(65) Prior Publication Data
US 2013/0062161 A1 Mar. 14, 2013

(30) Foreign Application Priority Data
Mar. 15, 2010 (EP) ........................... 1015646

(51) Int. Cl.
*B65G 47/84* (2006.01)
*B65G 47/31* (2006.01)
*B21D 51/26* (2006.01)

(52) U.S. Cl.
CPC ............ *B65G 47/31* (2013.01); *B21D 51/2692* (2013.01); *B65G 47/846* (2013.01); *B65G 47/848* (2013.01); *B65G 47/84* (2013.01)

(58) Field of Classification Search
USPC ......... 198/419.2, 377.02, 377.08, 459.2, 441, 198/450, 608
See application file for complete search history.

(56) References Cited

U.S. PATENT DOCUMENTS

| | | | | | |
|---|---|---|---|---|---|
| 1,463,527 | A | * | 7/1923 | Guenther | 198/461.2 |
| 1,581,200 | A | * | 4/1926 | Guenther | 198/461.1 |
| 1,689,247 | A | * | 10/1928 | Lange | 198/461.2 |
| 1,941,152 | A | * | 12/1933 | Noll | 198/459.2 |
| 3,887,059 | A | * | 6/1975 | Verjux | 198/450 |
| 3,978,968 | A | * | 9/1976 | Rose et al. | 198/339.1 |
| 7,743,907 | B2 | * | 6/2010 | Weinbrenner et al. | 198/459.2 |

FOREIGN PATENT DOCUMENTS

| | | |
|---|---|---|
| EP | 1828035 | 9/2007 |
| WO | WO 2007/123715 A2 | 11/2007 |
| WO | WO 2010/026115 A1 | 3/2010 |

OTHER PUBLICATIONS

International Search Report and the Written Opinion of the Searching Authority for International Application No. PCT/EP2011/053277 dated Mar. 4, 2011.

* cited by examiner

*Primary Examiner* — Mark A Deuble
(74) *Attorney, Agent, or Firm* — Baker & Hostetler LLP (57) ABSTRACT

An infeed apparatus for the manufacture of containers such as can bodies, comprises a series of 3 or more infeed turrets (22, 30). The infeed turrets (22, 30) take a can body as linear pitch and convert this pitch to a circular pitch. By use of the series of turrets, the can passes to a machine such as a container processing machine not only at a desired linear pitch but also at the specified processing speed. The exchange ratio between individual turrets (22, 30) in the infeed turret series is variable and no greater than 2:1.

20 Claims, 10 Drawing Sheets

Table 1

| D & I and extruded: 250CPM - 1500CPM CV infeed 5-turret (Gear and servo motor drive) |||||||
|---|---|---|---|---|---|---|
| T1<br>1Pocket<br>250RPM | T2<br>1Pocket<br>250RPM | T3<br>2Pockets<br>125RPM | T4<br>4Pockets<br>62.5RPM | T5<br>8Pockets<br>31.25RPM | 250 CPM<br>12 Recirculations ||
| | 1.44:1 | 2:1 | 2:1 | 2:1 | | |
| T1<br>2Pocket<br>250RPM | T2<br>2Pocket<br>250RPM | T3<br>4Pockets<br>125RPM | T4<br>6Pockets<br>83-1/3RPM | T5<br>8Pockets<br>62.5RPM | 500 CPM<br>6 Recirculations ||
| | 1.44:1 | 2:1 | 1.5:1 | 1-1/3:1 | | |
| T1<br>3Pocket<br>250RPM | T2<br>3Pocket<br>250RPM | T3<br>4Pockets<br>187.5RPM | T4<br>6Pockets<br>125RPM | T5<br>8Pockets<br>93.75RPM | 750 CPM<br>4 Recirculations ||
| | 1.44:1 | 1-1/3:1 | 1.5:1 | 1-1/3:1 | | |
| T1<br>4Pocket<br>250RPM | T2<br>4Pocket<br>250RPM | T3<br>4Pockets<br>250RPM | T4<br>6Pockets<br>166-2/3RPM | T5<br>8Pockets<br>125RPM | 1000 CPM<br>3 Recirculations ||
| | 1.44:1 | 1:1 | 1.5:1 | 1-1/3:1 | | |
| T1<br>6Pocket<br>250RPM | T2<br>6Pocket<br>250RPM | T3<br>6Pockets<br>250RPM | T4<br>6Pockets<br>250RPM | T5<br>8Pockets<br>187.5RPM | 1500 CPM<br>2 Recirculations ||
| | 1.44:1 | 1:1 | 1:1 | 1-1/3:1 | | |

Fig.8B.

Table 2

| D & I: 500CPM - 1500CPM tangential infeed 5-turret |
|---|

| T1<br>2Pocket<br>250RPM | T2<br>2Pocket<br>250RPM | T3<br>4Pockets<br>125RPM | T4<br>8Pockets<br>62.5RPM | T5<br>12Pockets<br>41-2/3RPM | 500 CPM<br>6 Recirculations |
|---|---|---|---|---|---|
| 1.44:1 | 2:1 | 2:1 | 1.5:1 | T5<br>15Pockets<br>33-1/3RPM<br>1.875:1 | |

| T1<br>3Pocket<br>250RPM | T2<br>3Pocket<br>250RPM | T3<br>6Pockets<br>125RPM | T4<br>10Pockets<br>75RPM | T5<br>12Pockets<br>62.5RPM | 750 CPM<br>4 Recirculations |
|---|---|---|---|---|---|
| 1.44:1 | 2:1 | 1-2/3:1 | 1.2:1 | T5<br>15Pockets<br>50RPM<br>1.5:1 | |

| T1<br>4Pocket<br>250RPM | T2<br>4Pocket<br>250RPM | T3<br>6Pockets<br>166-2/3RPM | T4<br>10Pockets<br>100RPM | T5<br>12Pockets<br>83-1/3RPM | 1000 CPM<br>3 Recirculations |
|---|---|---|---|---|---|
| 1.44:1 | 1.5:1 | 1-2/3:1 | 1.2:1 | T5<br>15Pockets<br>66-2/3RPM<br>1.5:1 | |

| T1<br>6Pocket<br>250RPM | T2<br>6Pocket<br>250RPM | T3<br>8Pockets<br>187-1/2RPM | T4<br>10Pockets<br>150RPM | T5<br>12Pockets<br>125RPM | 1500 CPM<br>2 Recirculations |
|---|---|---|---|---|---|
| 1.44:1 | 1-1/3:1 | 1-1/4:1 | 1.2:1 | T5<br>15Pockets<br>100RPM<br>1.5:1 | |

Fig.8C.
Table 3

| D & I and extruded: 250CPM - 1500CPM CV infeed 5-turret (Gear driven) |
|---|

| T1<br>1Pocket<br>250RPM | T2<br>1Pocket<br>250RPM | T3<br>1Pockets<br>250RPM | T4<br>2Pockets<br>125RPM | T5<br>2Pockets<br>125RPM | 250 CPM<br>12 Recirculations |
|---|---|---|---|---|---|
| 1.44:1 | 1:1 | 2:1 | 1:1 | | |

| T1<br>2Pocket<br>250RPM | T2<br>2Pocket<br>250RPM | T3<br>2Pockets<br>250RPM | T4<br>4Pockets<br>125RPM | T5<br>4Pockets<br>125RPM | 500 CPM<br>6 Recirculations |
|---|---|---|---|---|---|
| 1.44:1 | 1:1 | 2:1 | 1:1 | | |

| T1<br>3Pocket<br>250RPM | T2<br>3Pocket<br>250RPM | T3<br>3Pockets<br>250RPM | T4<br>6Pockets<br>125RPM | T5<br>6Pockets<br>125RPM | 750 CPM<br>4 Recirculations |
|---|---|---|---|---|---|
| 1.44:1 | 1:1 | 2:1 | 1:1 | | |

| T1<br>4Pocket<br>250RPM | T2<br>4Pocket<br>250RPM | T3<br>4Pockets<br>250RPM | T4<br>8Pockets<br>125RPM | T5<br>8Pockets<br>125RPM | 1000 CPM<br>3 Recirculations |
|---|---|---|---|---|---|
| 1.44:1 | 1:1 | 2:1 | 1:1 | | |

| T1<br>6Pocket<br>250RPM | T2<br>6Pocket<br>250RPM | T3<br>6Pockets<br>250RPM | T4<br>12Pockets<br>125RPM | T5<br>12Pockets<br>125RPM | 1500 CPM<br>2 Recirculations |
|---|---|---|---|---|---|
| 1.44:1 | 1:1 | 2:1 | 1:1 | | |

Fig.9.

CONTAINER MANUFACTURE

TECHNICAL FIELD

This invention relates to container manufacture and, in particular, to an infeed apparatus for providing containers to a container processing machine. Such a container processing machine may be used for the manufacture of containers such as metal cans, bottles or aerosol can bodies. These machines are used for a variety of processes. One example of a can manufacturing process requires progressive changes in the open end diameter of a can body for the formation of a "neck" by reducing that diameter in a series of stages.

BACKGROUND ART

It is common practice to form a neck in a container body such as a beverage can by a "die necking" process. In a die necking process, cans are pushed longitudinally into dies so as gradually, over several necking stages, to reduce the neck diameter. The infeed to such a process may include a conveyor carrying a row of can bodies, in which the can bodies contact each other. In the conveyor, the can bodies have a "pitch" (i.e. the distance between their centres) of one can diameter. The can bodies are fed from this conveyor to an infeed turret of the processing (in this example, die necking) machine.

WO 2010/026115 A describes a triple turret infeed and waxer assembly comprising an infeed turret and a waxer turret with a transfer turret between the infeed and waxer turrets. The infeed assembly of this application includes an infeed turret which receives incoming can bodies from a chute, an infeed transfer turret and a waxer turret. The number of pockets on the turrets is the same, thereby avoiding damage when waxing rollers on the waxing turret engage an incoming can body. Whilst the invention of this application teaches how to break up the acceleration of the can bodies, there are no distinct tool groups to which the waxed cans are fed.

EP 1828035 A (CROWN PACKAGING TECHNOLOGY, INC) describes container processing equipment comprising multi-stage process handling equipment of about 50 individual stages, each stage requiring different tooling or "tool groups". The process handling equipment comprises apparatus with at least one rotatable process turret having a number of pockets, each pocket being adapted to support an article. The pockets are divided into groups, with each group of pockets having associated tooling. Although the apparatus also includes a re-phase means to transfer an article from one group of pockets to the next, the pitch of a can is not changed. Instead, the multi-stage process is a system for moving the can one pitch so that the can is presented, say, to the second members of the tool groups on the second recirculation, or third members of the tool groups on the third recirculation (or nth members of the tool groups on the nth recirculation).

The challenge for a rotary machine infeed system for feeding cans to any container manufacturing process including die necking, is that the machine takes delivery of container bodies which are spaced or "pitched" in a linear fashion, and the infeed system must change the pitch between the container bodies to that of a circular turret—and a larger pitch. The processing pitch may also need to be larger in order to accommodate tools for performing the necking process. The manufacturing process will also have to be carried out at the line speed, often in excess of 1500 containers per minute or greater.

Each turret on a rotary machine has a number of pockets, each pocket being adapted to receive and retain a containers such as a can body, for example by vacuum. The pockets to carry the can bodies on each circular turret are each separated by a (pocket) pitch. The closer this pocket pitch is to the can body diameter the better the feed onto the infeed turret.

The present invention seeks to provide an infeed apparatus comprising a series of turrets, which has the facility to change the rotational speed of individual turrets, the turrets having fixed centre distances (between their rotating turret axes) and differing numbers of pockets, so as to be able to deliver cans at discrete circular pitches to a container manufacturing machine.

SUMMARY OF INVENTION

According to the present invention there is provided an infeed apparatus for providing containers to a process turret on a container processing machine, the apparatus comprising:
  a conveyor for delivering containers at a linear pitch;
  an infeed turret for receiving the containers and increasing the pitch of the containers to the circular pitch of the infeed turret; and
  a series of two or more further circular turrets which receive and transfer the containers;
characterised in that:
  the final circular turret of the infeed apparatus is adapted to have the same number of pockets as the number of tools per tool group on a subsequent process turret of a container processing machine to which the cans are supplied by the infeed apparatus; and
  the exchange ratio from one turret to the next of the infeed apparatus is discrete and no greater than 2:1.

For the avoidance of doubt, the expression "discrete" is used herein to mean individually distinct. The infeed apparatus of the present invention is thus adapted to supply containers to a re-circulating loop of a container processing machine such as that described in EP 1828035 A and changes infeed pocket numbers and speed to deliver the can, subsequently, into the production loop, at the pitch of the first members of the tool group. Through regulating the container pitch, the infeed apparatus facilitates subsequent re-circulation of the containers within the production machine.

The supply of containers from the conveyor to the first turret of the infeed apparatus may either be constant velocity or tangential to the turret. In one example, the ratio of circular pitch between pockets on a 300 mm diameter first turret to the container body diameter or spacing on the linear conveyor may be 1.2 to 1.5 for a tangential infeed turret or 1.8 to 2.6 for a constant velocity (sometimes referred to simply as "CV") infeed. The infeed apparatus uses a series of rotating turrets, which are adapted to transfer the containers and to increase their circular pitch to that of a first process turret on the container processing machine—or some multiple of that process turret circular pitch. Subsequently, the processing turret on a high-speed machine may operate at a speed of up to 250 rpm for example, using recirculation of containers on the container processing machine in order to achieve the final output of up to 1500 containers (or cans) per minute.

Preferably, each of the series of turrets of the infeed apparatus has a selected number of pockets which are separated by a specific pitch and the number of pockets on the final turret of the infeed apparatus dictates the number of circulations of the containers on the container processing machine in order to achieve the desired final output.

The infeed apparatus may use gear and/or servo motor drives to drive rotation of the turrets. The increase in container pitch may thus be achieved either by a change in turret diameter, or by adjusting both the number of turret pockets and the rotational speed of the turret.

Although it is known to recirculate and re-phase cans in, for example, the can necking machine of EP 1828035, the Applicant has now discovered that it is possible to re-pitch the linearly delivered containers such as can bodies to a range of circular turret pitches in the infeed apparatus. Re-pitching may be selected according to the number of re-circulations in the can processing machine, not only by fixing the pitch ratio (as noted above) but also by the use of servomotors in the infeed apparatus, which can operate a range of gear ratios for a group of turrets. The advantage of using servomotors is that complex gearboxes or time-consuming manual change gear systems are avoided. Servomotor driven turrets realise the facility to change the number of turret pockets and turret speed independently and so deliver the range of circular pitches that are required by the re-circulations of the high-speed machine, which can be used for a variety of containers.

The infeed apparatus of the present invention thus achieves an increase in container, or can, pitch either by a change in turret diameter, or by adjusting both the number of turret pockets and the rotational speed of the turret.

The exchange ratio is never more than 2:1 between turrets so as to avoid damaging the can, and the infeed apparatus uses a series of between 3 and 5 turrets. The use of 5 turrets has been shown by the Applicant to give the best flexibility in the infeed apparatus and the attached examples show a series of five turrets in the infeed apparatus.

Between two and 12 re-circulations in the container processing machine gives the best results, depending on the type of container supply to the first turret of the infeed apparatus, i.e. tangential or CV. The number of re-circulations also depends on the number of tools per tool group. The number of tool groups is a multiple of the number of pockets on the process turret. The turret pitch ranges obtained may be one of five different pitches, depending on 2, 3, 4, 6 or 12 re-circulations. On the final infeed turret, the number of pockets is the same as the number of tools per tool group on the process turret. The containers formed by the container processing machine may be of the drawn and ironed ("D&I") or extruded types.

Preferably, cans or other containers are passed from one turret to the next in the infeed apparatus by interfacing turret pockets. This may require trailing edge adjustment in which the trailing edge of one turret extends above its pitch circle diameter and the next turret has a local relief, which allows passage of the extension.

The final transfer turret of the infeed apparatus, which is adjacent the process turret of the container processing machine, and the process turret itself, are usually driven by the main gear system.

According to a further aspect of the present invention, there is provided a method of adjusting container pitch for delivery to a container processing machine, the method comprising:
providing containers separated by a linear pitch;
   receiving the containers on an infeed turret so that the containers are separated by a circular pitch;
   passing the containers via a series of further circular turrets to a container processing machine; and, optionally,
   recirculating containers on the container processing machine;
   characterised in that the step of passing the containers uses distinct exchange ratios between adjacent turrets which are no greater than 2:1.

BRIEF DESCRIPTION OF DRAWINGS

Preferred embodiments of the invention will now be described, by way of example only, with reference to the drawings, in which.

DESCRIPTION OF EMBODIMENTS

Figure 1:
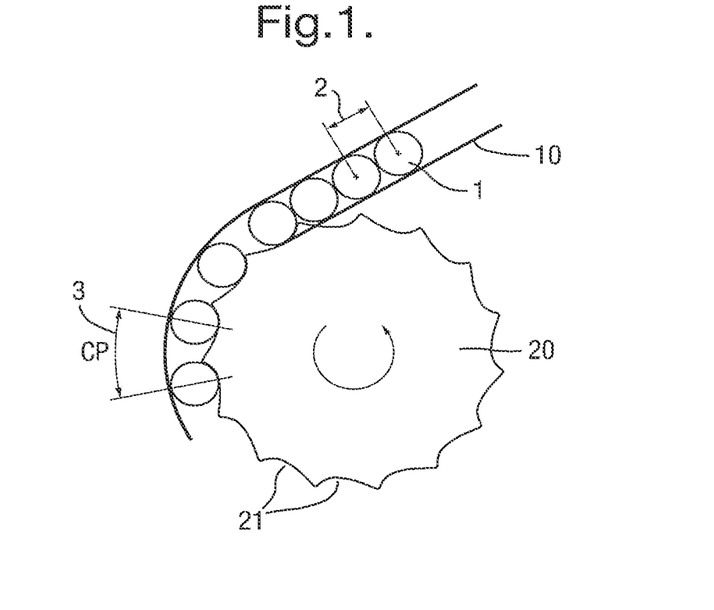
FIG. 1 is a schematic section of an infeed turret with tangential infeed.

FIG. 1 shows a series of cans 1 being supplied from a conveyor 10 to an infeed turret 20. In the conveyor 10, the cans 1 contact each other such that the can spacing is one can diameter or centre-to-centre 2. The conveyor 10 of FIG. 1 feeds the cans 1 along a tangent to the infeed turret 20 so that the turret is also referred to as a tangential infeed turret. In this example the turret has 15 pockets 21 which are spaced at a circular pitch 3. Thus the pitch has been increased by the act of feeding the cans onto the infeed turret. The direction of rotation of the infeed turret is indicated by the arrow.

Figure 2:
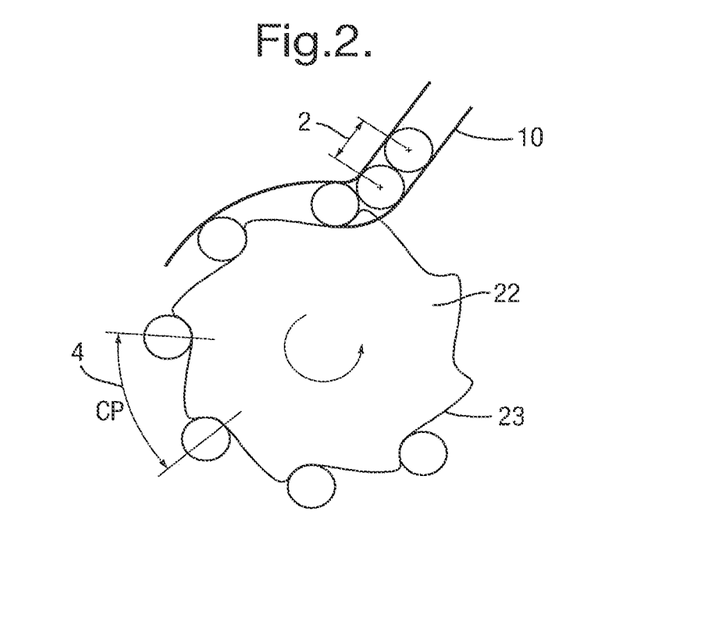
FIG. 2 is a schematic section of an infeed turret with constant velocity ("CV") infeed.

FIG. 2 shows an alternative infeed which also increases the can pitch from that of the can diameter 2 as the cans contact each other in a linear fashion in the conveyor 10, to the circular pitch 4 of cans on the infeed turret 22. This infeed turret has 8 pockets 23 and the cans are fed at a constant velocity (CV) onto each pocket in turn as the infeed turret rotates in an anti-clockwise manner.

Figure 3A:
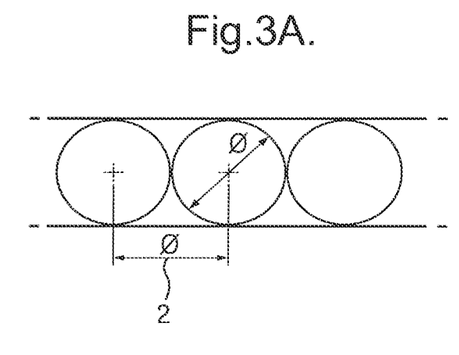
FIG. 3 is a schematic section showing pitch increase between conveyor and infeed turret.
Figure 3B:
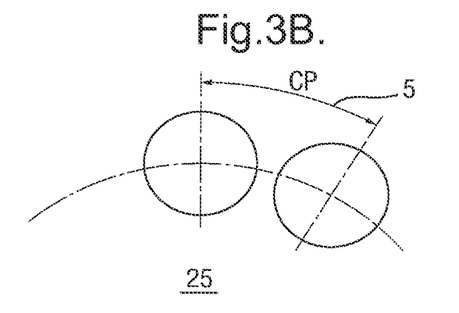

A further indication of the pitch increase is demonstrated by the separate parts A and B of FIG. 3. In FIG. 3A, the cans are in contact with each other on/in the conveyor so that the pitch is one can diameter, as reference 2 in FIGS. 1 and 2. The schematic of FIG. 3B shows the circular pitch 5 for a 300 mm diameter turret 25. The pitch increase between adjacent cans is quantified by the "ratio" circular pitch to can diameter. In FIG. 3, this would be the ratio of the pitch of reference 5 to diameter reference 2.

With reference to FIGS. 1 and 2, it has been found that for a CV infeed turret of 300 mm diameter and having 8 pockets, can diameters of 45 mm to 66 mm diameter can be processed, without damage, using a ratio of circular pitch to can diameter at infeed from the linear conveyor of 1.8 to 2.6. Similarly, for a tangential infeed turret of 300 mm diameter and having 15 pockets, can diameters of 45 mm to 53 mm diameter can be processed, without damage, using a ratio of circular pitch to can diameter at infeed of 1.4 to 1.2, and a tangential infeed turret of 300 mm diameter and having 12 pockets and can diameters of 53 mm to 66 mm diameter can be processed, without damage, using a ratio of circular pitch to can diameter at infeed of 1.5 to 1.2.

Figure 4A:
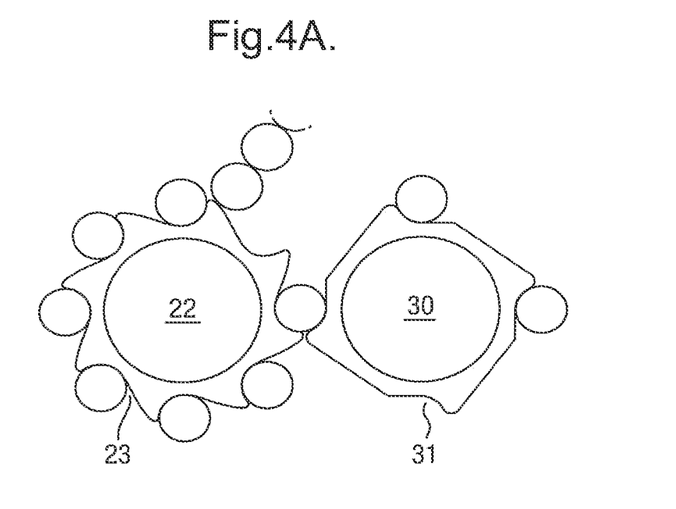
FIG. 4 is a schematic section showing pitch increase during exchange from infeed turret onto first transfer turret of the infeed system.
Figure 4B:
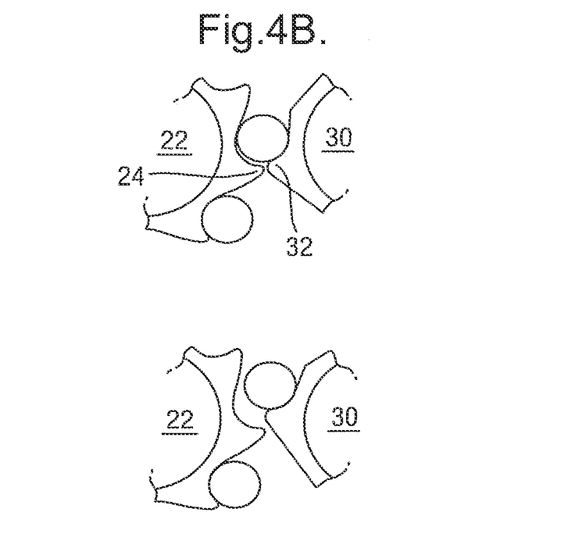

The pitch is increased further from the infeed turret 22 to transfer turret 30 of FIG. 4A. Infeed turret 22 has 8 pockets 23 for cans, which then pass to transfer turret 30, which has 4 pockets 31. The exchange of cans from one turret to the next is more clear from the enlarged view of FIG. 4B and shows the maximum recommended exchange ratio of 2:1 between turrets, i.e. 8 pocket turret 22 to 4 pocket turret 30. The turret pitches are interfacing and, as shown in FIG. 4B, the trailing edge 24 of infeed turret pocket 23 extends above the pitch circle diameter and the transfer turret is slightly relieved locally (the position indicated approximately by reference 32) to improve this interface between the pockets on can exchange.

The FIGS. 5 to 7 and 9 are schematics of 3 different infeed systems each comprising a series of five turrets (T5 to T1) and associated drives. As well as examples of embodiments of infeed systems of the present invention, FIGS. 5 and 6 also show schematics of a prior art container processing machine arrangement for use with two or three re-circulations respectively.

Figure 5:
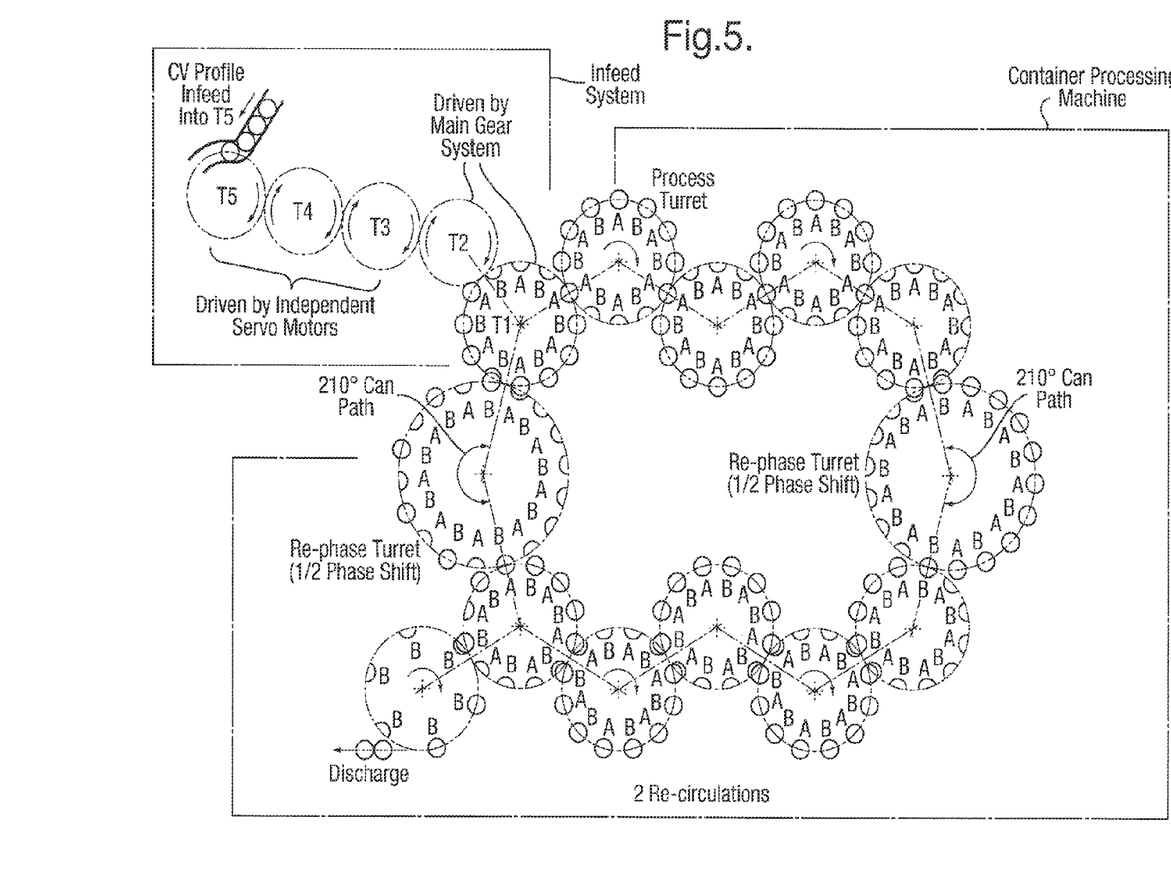
FIG. 5 is a schematic of a first infeed system using gear and servo motor drive, together with a schematic of a container processing machine arrangement for use with two re-circulations.
Figure 6:
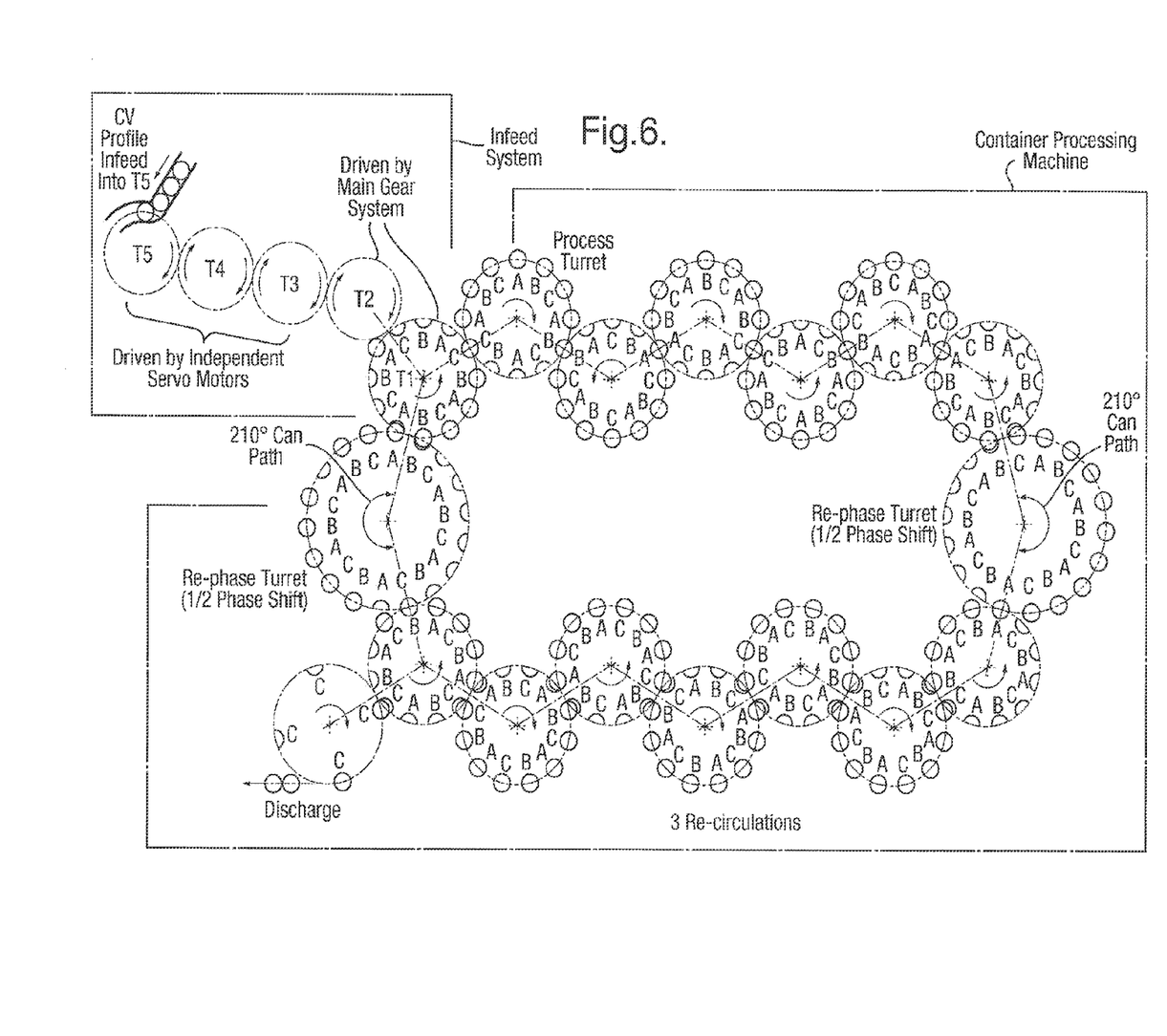
FIG. 6 is a schematic of a first infeed system using gear and servo motor drive, together with a schematic of a container processing machine arrangement for use with three re-circulations.
Figure 7:
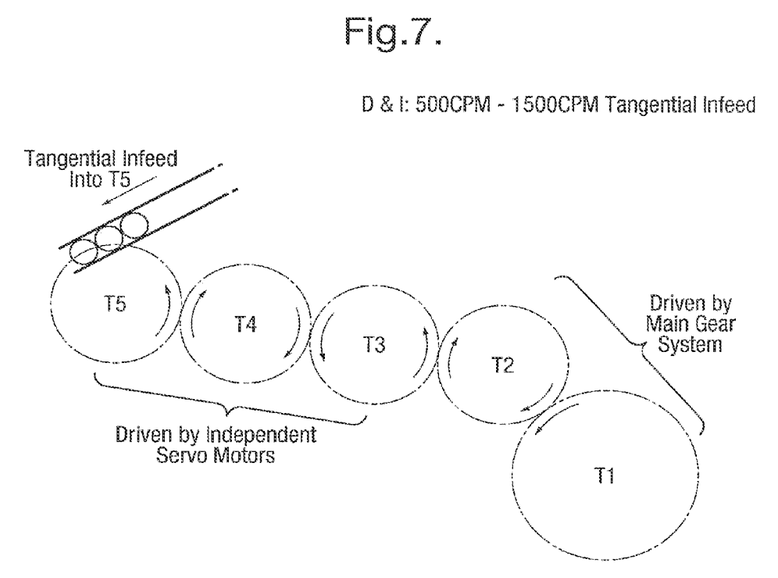
FIG. 7 is a schematic of a second infeed system using gear and servo motor drive.

The first process turret, to which a container passes from T1, rotates at 250 rpm, as does T1. In FIGS. 5 and 6, turrets T5 to T3 are all 300 mm in diameter and are driven by independent servomotors in the directions indicated by the arrows, whereas turrets T2 and T1 are both driven by the main gear system so that there is a constant gear ratio between T2 and T1. T2 is 300 mm in diameter and T1 432 mm diameter—the same diameter as the process turret. The system of FIGS. 5 and 6 is suitable for both extruded and drawn and ironed (D&I) cans and regulates the number of re-circulations within the container processing machine, and hence production speeds to between 250 and 1500 cans per minute ("cpm"), depending on the speed and number of pockets on each turret of the infeed system.

Figure 8A:
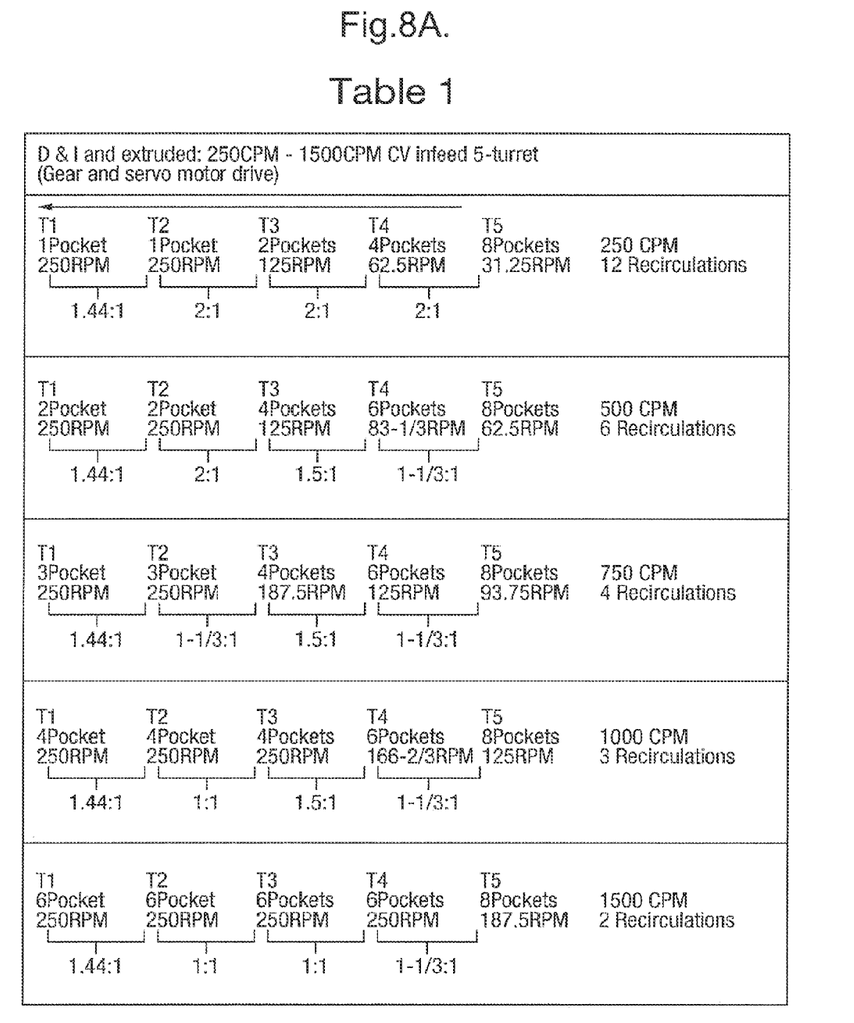
FIG. 8A depicts Table 1 that relates to FIGS. 5 and 6.

System one (FIGS. 5 and 6 and Table 1) shows the range of cans per minute, which are processed for a constant velocity infeed with gear and servo motor drive. Five different infeed system arrangements are given, suitable for container processing machines of from 12 re-circulations, which processes 250 cans per minute, to 2 re-circulations, which processes 1500 cans per minute.

The individual rows in each part of the table are as follows: T1 to T5 are the turret numbers, with T5 being the first to receive cans, number of pockets for each turret, turret rotational speed in rpm and exchange ratio. The exchange ratio is the increase in "can" pitch as a result of the transfer between two turrets. As noted above, this is variable from one turret to the next up to a maximum of 2:1. It can be seen from the table that, for example the last set of data achieves 1500 cpm but requires a first T5 revolution of 187.5 rpm directly from the linear conveyor feed.

Figure 8B:
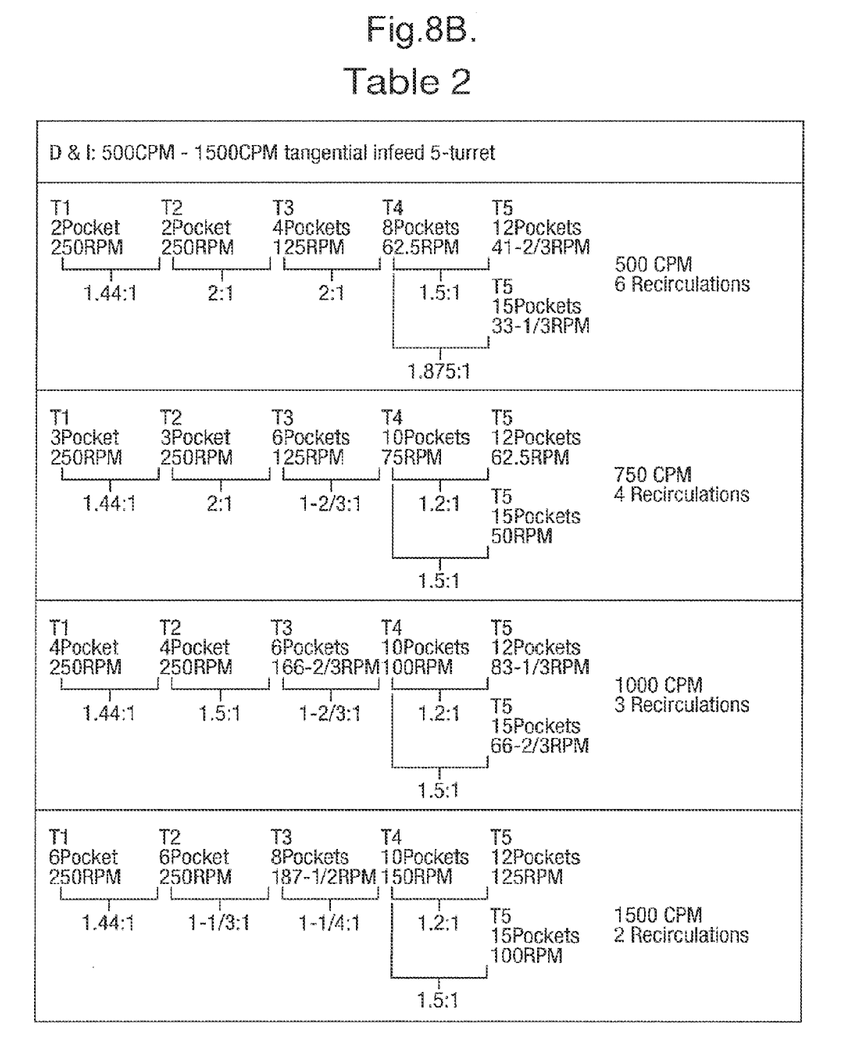
FIG. 8B depicts Table 2 that relates to FIG. 7.

System 2 (FIG. 7 and Table 2) uses a gear and servo-motor drive with T5 to T3 driven by independent servo motors and T2 and T1 driven by the main gear system. This system uses tangential infeed to process 500-1500 cpm. However, 12 re-circulations on the subsequent container processing machine are not possible from this five turret infeed system because T5 must have 15 or 12 pockets (see FIG. 1), so maintaining the ratio of 1.2 to 1.5 between conveyor pitch cans and infeed turret circular pitch, and T1 must have one pocket, whilst keeping the exchange ratio to no greater than 2:1 between turrets. There are therefore only four sets of data in table 2, although different options for T5 being either 12 or 15 pockets are provided for each set.

Figure 8C:
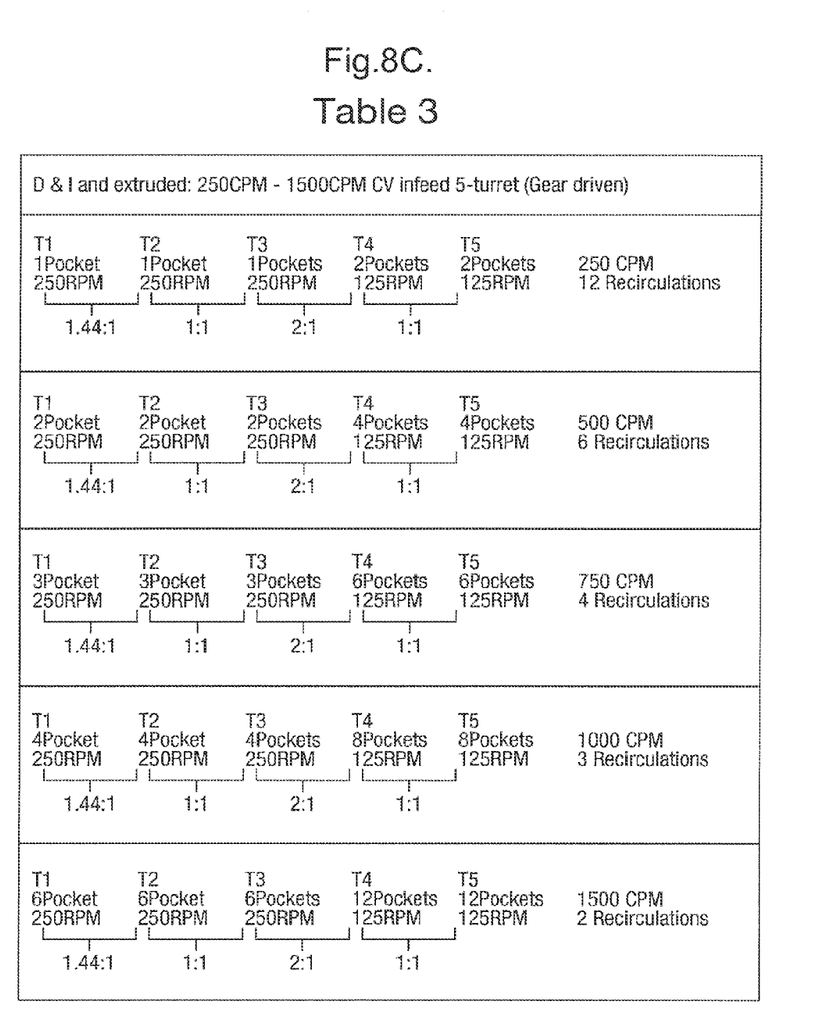
FIG. 8C depicts Table 3 that relates to FIG. 9.

Finally, system 3 (FIG. 9 and Table 3) is totally gear driven, T5 to T3 being driven by gears from the main gear system, and T2 and T1 being driven by the main gear system itself. Infeed is constant velocity profile and as in both earlier systems, T5 to T2 are 300 mm diameter and T1 is 432 mm diameter. Being CV input, infeed to a container processing machine with the full range of circulations is possible, up to 12.

Figure 9:
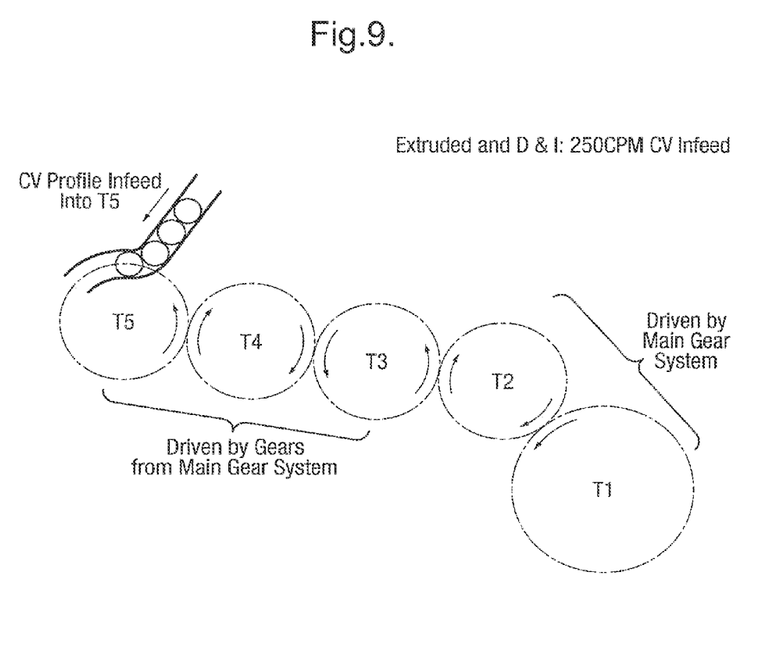
FIG. 9 is a schematic of a third infeed system using gear drive only.

The level of risk causing failure for this system is high for the CV infeed turret 2 pocket, 4 pocket or 12 pocket because the ratio between conveyor pitched cans and infeed turret circular pitch is greater than 2.6.

Infeed systems of the invention have been described above by way of example only, and changes may be made for example to the type of container processed by the subsequent container processing machine without departing from the scope of the invention as defined by the claims.

The invention claimed is:

1. An infeed apparatus for providing containers to a process turret on a container processing machine, the infeed apparatus comprising:
   a conveyor for delivering containers at a linear pitch;
   an infeed turret for receiving the containers and increasing the pitch of the containers to the circular pitch of the infeed turret;
   a series of at least two further transfer turrets, each further transfer turret having pockets that (i) are circumferentially fixed in relation to one another and (ii) are configured to receive and transfer the containers, wherein an exchange ratio from one turret of the at least two further turrets to the next of the at least two further turrets is no greater than 2:1.

2. The infeed apparatus according to claim 1, wherein the supply of containers from the conveyor to the infeed turret is either at constant velocity or tangential to the infeed turret.

3. The infeed apparatus according to claim 1, wherein the series of rotating turrets are adapted to transfer the containers and to increase their circular pitch to that of a first processing turret on the container processing machine.

4. The infeed apparatus according to claim 1, comprising motor drives, which drive rotation of the turrets.

5. The infeed apparatus according to claim 1, wherein an increase in container pitch is either by a change in turret diameter, or by adjusting both the number of turret pockets and the rotational speed of the turret.

6. The infeed apparatus according to claim 1, wherein the apparatus includes a series of 5 turrets.

7. The infeed apparatus according to claim 1, wherein a trailing edge of one turret extends above the pitch circle diameter for trailing edge adjustment and the next turret has a local relief which allows passage of the extension.

8. The infeed apparatus according to claim 1, wherein the exchange ratios between turrets of the infeed apparatus are discrete.

9. The infeed apparatus according to claim 1, wherein the exchange ratios between turrets of the infeed apparatus are greater than 1:1.

10. A method of adjusting container pitch in an infeed apparatus for delivery to a container processing machine, the method comprising:
    positioning containers separated by a linear pitch;
    receiving the containers on an infeed turret so that the containers are separated by a circular pitch;
    passing the containers via a series of at least two further transfer turrets, each further transfer turret having pockets that are circumferentially fixed in relation to one another and that receive and transfer the containers, wherein an exchange ratio from one turret of the at least two further transfer turrets to the next of the at least two further transfer turrets is no greater than 2:1; and passing the containers from a final turret of the series of at least two further transfer turrets to a first turret of the container processing machine, wherein the first turret of the processing machine includes a plurality of pockets that are each configured to support the containers, the plurality of pockets being separated into groups of pockets, the first turret of the processing machine further including a respective group of tools that is associated with each group of pockets, each group of tools having a number of tools, and the final turret of the series of at least two further transfer turrets has a number of pockets that is the same number as the number of tool groups on the first turret of the processing machine.

11. A method according to claim 10, including driving rotation of the turrets in the infeed apparatus by motor drives.

12. A method according to claim 10, comprising increasing container pitch in the infeed apparatus.

13. A method according to claim 12, wherein the step of increasing container pitch in the infeed apparatus comprises changing the turret diameter.

14. A method according to claim 12, wherein the step of increasing container pitch in the infeed apparatus comprises adjusting at least one of the number of turret pockets and the rotational speed of the turret.

15. The method according to claim 10, wherein the exchange ratios between turrets of the infeed apparatus are discrete.

16. The method according to claim 10, wherein the exchange ratios between turrets of the infeed apparatus are greater than 1:1.

17. An infeed apparatus and container processing machine combination, comprising:

a processing machine having a first process turret that includes a plurality of pockets that are each configured to support a container, the plurality of pockets being separated into groups of pockets, the first process turret further including a respective group of tools that is associated with each group of pockets, each group of tools having a number of tools; and an infeed apparatus configured to transfer containers to the processing machine, the infeed apparatus comprising:
 a conveyor for delivering the containers at a linear pitch;
 an infeed turret for receiving the containers from the conveyor so that the containers are separated by a circular pitch; and
 a series of at least two transfer turrets that receive the containers from the infeed turret and transfer the containers to the first process turret, wherein a final transfer turret of the at least two transfer turrets has a number of pockets that is the same number as the number of tool groups on the first process turret, and wherein an exchange ratio from one turret to the next of the infeed apparatus is no greater than 2:1.

18. The combination according to claim 17, wherein the exchange ratios between turrets of the infeed apparatus are discrete.

19. The combination according to claim 17, wherein the exchange ratios between turrets of the infeed apparatus are greater than 1:1.

20. The combination according to claim 17, wherein each transfer turret of the series of transfer turrets has a selected number of pockets separated by a specific pitch and the number of pockets on the final transfer turret of the infeed apparatus dictates the number of recirculations of the containers on the container processing machine in order to achieve the desired final output.

* * * * *